April 29, 1969   A. W. FRANCIS, JR., ET AL   3,441,499
METHOD FOR TREATING CRUDE PETROLEUM PRODUCTION
Filed Sept. 23, 1965
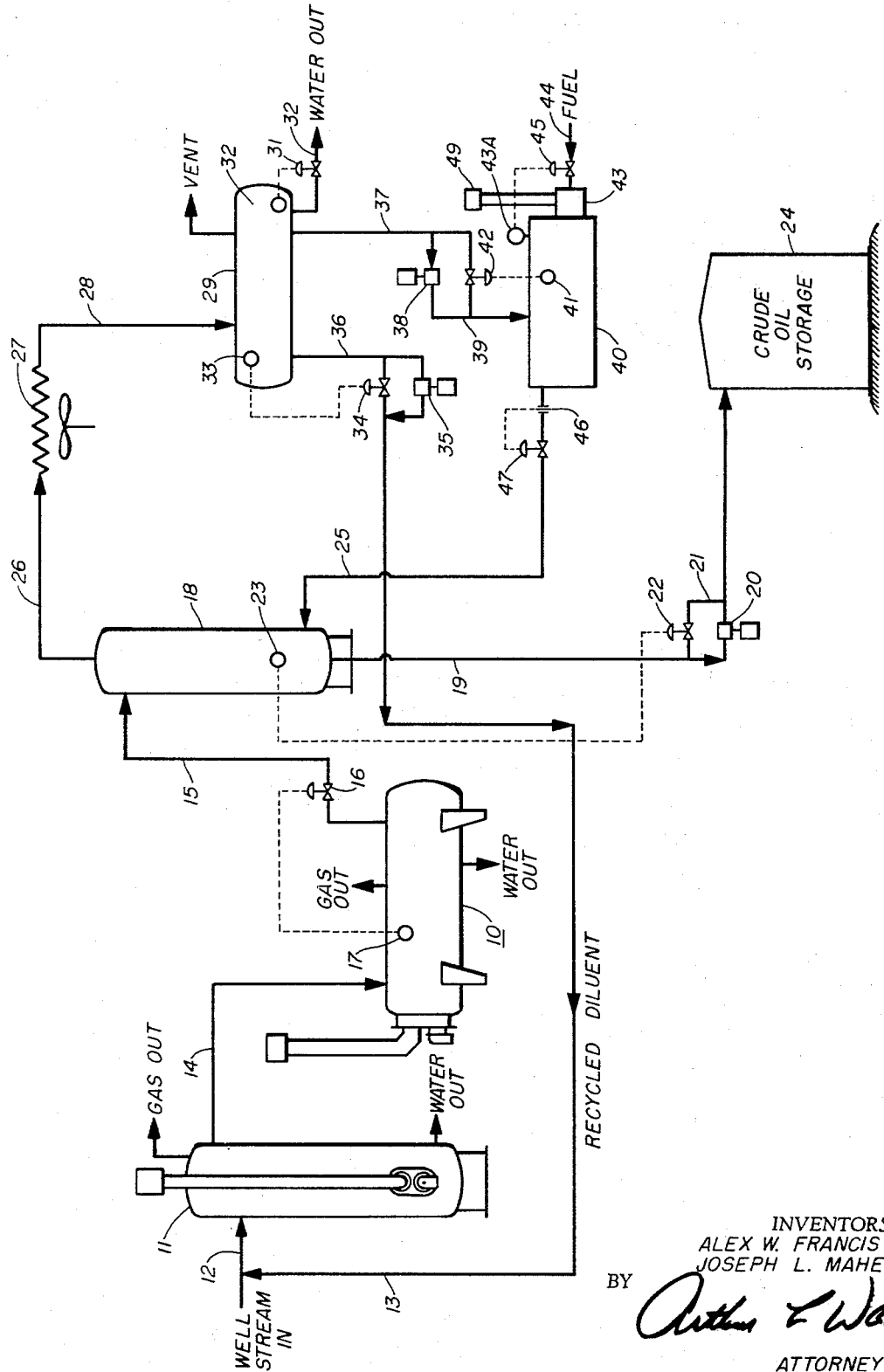
INVENTORS.
ALEX W. FRANCIS JR.
JOSEPH L. MAHER
BY Arthur L Wade
ATTORNEY United States Patent Office 3,441,499
Patented Apr. 29, 1969

3,441,499
**METHOD FOR TREATING CRUDE
PETROLEUM PRODUCTION**
Alex W. Francis, Jr., and Joseph L. Maher, Tulsa, Okla.,
assignors to Combustion Engineering, Inc., New York,
N.Y., a corporation of Delaware
Filed Sept. 23, 1965, Ser. No. 489,529
Int. Cl. C10g *33/00*
U.S. Cl. 208—187                                    2 Claims The present invention relates to the initial field processing of oil well production which has low gravity and high viscosity. More particularly, the invention relates to shifting the physical properties of the liquid production to facilitate disengagement of water and other foreign material from the liquids.

It is generally known that dilution of extremely viscous oil well production with a compatible material will greatly facilitate disengagement of water and other foreign material therefrom. Heat, chemicals and other forces can then effectively separate the crude production into its water and oil.

Ten to twenty percent of kerosene diesel mixture, commonly called KD, has been of great assistance in treating 9° API gravity oil. KD has been purchased from a refinery and injected down the annulus of the well or into the flow line ahead of the treating system. This diluent was effective in facilitating separation and became a part of the oil sold, increasing the gravity and volume. However, KD presently costs not less than $3.00 to $3.25 per barrel. As the final mixture sells for about $1.80 per barrel, the recovery of the KD cost is only about 60%.

A diluent system is basically attractive because of the low percent of diluent required to obtain the desired results. Any recycle provision for a diluent would greatly enhance this technique of reducing the viscosity and density of the production as it is moved from the well through the processing system.

The problem can now be set out in formal terms. The 8 to 14° API oil being recovered in areas such as California is troublesome to handle and treat. The oil is very dense and highly viscous. Emulsions with this oil are difficult to break, even with combined heat, chemicals addition, and electrostatic coalescing.

The approach to the solution of this problem is to dilute the crude, either on or below the surface, with a hydrocarbon liquid of suitable boiling range and nature. Treat the diluted mixture to remove BS & W. Then remove the diluent. Finally, store and recycle the diluent.

Investigation of diluent characteristics necessary to effect a maximum reduction in viscosity and density of crude, with minimum loss of the crude, resulted in the discovery that 10% of diluent, whether natural gasoline or kerosene, produced about the same reduction. The only advantage of using a very light diluent would have to be found in an increase in the ease of separation of crude and diluent. It next developed that no matter what diluent was originally selected, over a period of time the diluent tends to assume the character of the small amount of light material in the front end of the crude. It was concluded that a relatively light diluent should be initially built from the light fractions of the crude itself.

Having narrowed the solution of the problem around the nature selected for the diluent, recovery of this diluent from the mixture for recycle was analyzed as limited to three general methods:

(1) Atmospheric flash with heating.
(2) Vacuum flash with heating.
(3) Vapor stripping.

If methods one and two were to be used with a closed-cycle for the diluent of the lighter fractions of the crude itself, the flash would have to take place at the bubble-point of the crude. This means, in the general case, that temperatures would have to be in the order of 490° and 390° F. at 14.7 and 5 p.s.i.a., respectively. These temperatures are considered excessively high in such a field process. Therefore, the straight flashing methods are not looked upon as practical.

Considering preferred method three, methane was first investigated as a stripping medium. Superheated steam was then studied as a variation of this medium. Because it has no hydrocarbons, steam facilitates recovery of all hydrocarbons it strips from the liquids. Therefore, the volume of steam required for stripping is considerably less than the volume of methane required. Additionally, steam is attractive because the water condensed is readily separated from hydrocarbons.

A principal object of the invention is to place a vapor in equilibrium contact with dehydrated oil to vaporize the lighter hydrocarbons of the oil for subsequent and isolated and remote condensation of the hydrocarbons in a quantity sufficient to meet the dilution demand of the crude prior to dehydration.

Another object is to utilize steam as the vapor for stripping the light hydrocarbons from the dehydrated oil.

Another object is to maintain the steam and light hydrocarbons in a closed cycle system.

The present invention contemplates placing vapor in vapor equilibrium contact with dehydrated oil from production of relatively low density and gravity. A series of light fractions are thereby stripped from the oil. The vapor mixture is then cooled to condense the hydrocarbons. The vapor used is preferably steam. Water and hydrocarbons are then condensed. The water and hydrocarbons are separated from each other. The cycle is completed by transferring the water condensed to a steam generator and the hydrocarbons condensed to the production prior to dehydration.

Other objects, advantages and features of this invention will become apparent to one skilled in the art upon consideration of the written specification, appended claims, and attached drawings, wherein;

The drawing is a schematic flow diagram of a system in which the present invention is embodied.

FIELD PROCESSING—TREATING

Referring specifically to the drawing, there is disclosed a complete system for dehydrating the liquids of crude oil production. Basically, the production is received in a vessel 10 where heat may be applied to the production before water is coalesced and removed from the oil, leaving the oil dehydrated enough to be marketable at a refinery.

Before the production is passed through vessel 10, it may be preheated in a vessel 11. If used, this vessel is provided with a special construction which enables it to remove most of the sand entrained by the liquids flowing from the well. Further, a great deal of free water may be readily dropped from the liquids with this equipment. Vessel 11 represents one or more pieces of equipment which may be required to prepare the produced liquids for their final temperature level prior to coalescence in vessel 10.

Conduit 12 brings the complete stream of crude production to the system. This conduit is shown specifically introducing the stream into vessel 11, and a second conduit 13 is shown connected to conduit 12, representative of means with which to mix a diluent with the crude production upstream of the field processing equipment which vessels 10 and 11 represent.

It should be thoroughly appreciated that the vessels 10 and 11, and their connections with the stream of crude production, are but representative of many variations in equipment and hook-up for field-processing oil well production. For example, the diluent could be mixed with the production at a point further upstream than illustrated. There may be chemical injecting equipment, not shown, to reduce the surface tension between the oil and water of emulsion in the production. Gas may be removed at various locations; gas disengaged from the liquids in a more or less "free" state or gas evolved when the bubble point of the liquids is reached. Whatever the system of vessels and hook-up used, the present invention provides a diluent which facilitates the various steps of the field-processing of the crude production.

When their viscosity and density are lowered, the liquids will the more readily mix with chemicals. The free gas will more readily disengage from the liquids. The water will the more readily coalesce and then more readily fall and disengage from the lighter oil. These are some of the more obvious advantages gained from diluting the production with a liquid hydrocarbon consisting of lighter fractions. The diluent does not treat the production in any sense; it facilitates the treatment of the production by the conventional, well-known equipment and techniques that have been employed for many years.

The production from the preheater-desander 11 flows through conduit 14 and into treater 10. In treater 10 the production is heated, gas is discharged, water is drawn off and the dehydrated oil is discharged through conduit 15. There are many control segments associated with the treating equipment. It would not add to an understanding of the present invention to dwell on these various control features and their relation to each other. Only the direct control exerted over the discharged oil is indicated.

The pressure carried on treater 10 forces the oil through conduit 15. The rate of discharge is regulated by valve 16 which is placed in conduit 15. A level of the liquids in treater 10 is sensed by a float 17 and the position of this float used to develop a control force to position valve 16. The liquids of conduit 15 are thus delivered to stripping tower 18 where a predetermined range of lighter hydrocarbons are removed from the liquids as the diluent.

STRIPPING SYSTEM IN GENERAL

There are various fundamental techniques available for removing a selected range of hydrocarbons from the liquids of conduit 15. Steam stripping was selected for this embodiment of the invention. Superheated steam is passed in counter-curernt flow with the liquids in tower 18. A vapor mixture of steam and hydrocarbons is removed from the top of the tower while the stripped and dehydrated crude oil is removed from the bottom of the tower.

The crude oil is passed to storage and sale. The vapors are condensed into a mixture of water and the light hydrocarbons. The mixture is separated into its two components. The hydrocarbon liquid is cycled to conduit 12 as a diluent. The water is cycled to a steam generating system to form the superheated steam used as the stripping medium.

It is pointed out at this time that the liquids passed to tower 18 from conduit 15 contain a finite amount of water that the treating system could not remove. The percentage of the total volume of the liquids may be small, in the order of two percent or less, still there is an amount which will be vaporized in tower 18, along with a range of light hydrocarbons. This stripped water will be discussed further.

A separate closed cycle is provided for the diluent. A separate, closed cycle is provided for the water. The two cycles, in combination with the treating system, embody the present invention.

STRIPPING TOWER 18

The construction and operation of tower 18 is basically simple. It is arranged and operated like any vapor-liquid contacting tower in which vapor equilibrium contact is brought about.

Trays are arranged in a stack. The liquid is introduced from conduit 15 onto the top tray and descends from tray to tray. The liquid reaching the bottom of the tower is removed through conduit 19 by pump 20. A by-pass conduit 21 around pump 20 is controlled by valve 22 which is positioned by float 23. The liquid is delivered by pump 20 to tank 24 for storage and eventual sale. Therefore, liquid is withdrawn from tower 18 so as to maintain a liquid level sensed by float 23.

The tower is supplied superheated steam at its bottom from conduit 25. This steam ascends the stack of trays within tower 18 and removes a predetermined range of light hydrocarbons from the crude oil descending within the tower. This mixture of vaporized hydrocarbons and steam is removed through conduit 26. The vaporized hydrocarbons and steam are then cooled to condense the hydrocarbons for use as the diluent.

It is desirable that as little heat as possible be used in tower 18. The cost of heating the oil being stripped mounts quickly if the heat requirement goes up. Therefore, the pressure of the tower should be at a minimum so the heat requirement will be as low as possible. Actually, it is expected that tower 18 will be kept at a pressure very close to atmospheric pressure. However, these values of pressure, temperature and flow should not be discussed so as to obscure the basic concept of the invention which obtains the new results desired.

The vapors from conduit 26 flow into a cooler 27 where their temperature is dropped until condensation takes place. An air cooler is depicted as representative of structure to carry out this temperature reduction. A fan is shown, passing air over heat-exchange coils in which the vapor from conduit 26 is passed. The vapors are not all condensed. The mixture of condensate and remaining vapors passes into conduit 28 for delivery to three-phase separator 29.

SEPARATOR 29

As an individual unit, separator 29 is a conventional, well-known piece of apparatus. The stream from conduit 28 which is received into the vessel is a mixture of uncondensed vapor, water and the range of light hydrocarbons which was stripped from the crude oil in tower 18. Internal baffles of separator 29 are arranged to divide the water from the oil in separate compartments provided by the baffles.

The water is used to generate steam for use as the stripping medium in tower 18. Usually there will be more water collected in the separator 29 than stripping tower 18 requires. This is a result of the simple fact that the feed of liquids into tower 18 contains water that will be vaporized right along with the diluent hydrocarbons. Of course, this water will be condensed in cooler 27 and end up in separator 29. It is necessary to get rid of this excess water. Conduit 30 is connected to the water collected in separator 29. This conduit is then controlled by a valve 31 which is adjusted by float 32. Float 32 is responsive to the level of all water in separator 29, so if a predetermined level is maintained, excess water will be discharged through conduit 30.

Separation of the two liquid phases is carried out by allowing residence time for the liquids to separate and skimming the oil into a separate compartment. The oil level is sensed by float 33 which controls valve 34 in a by-pass conduit around pump 35. Pump 35 is connected to the oil in separator 29 by conduit 36. This pump system draws the oil, as the diluent, through conduit 36 and delivers it to conduit 13. The utilization of this diluent has already been disclosed. Thus, a complete, closed cycle is provided for the diluent which is built from a predetermined range of hydrocarbons of the very crude production diluted.

STEAM GENERATOR 40

The water not in excess within separator 29 is withdrawn from separator 29 through conduit 37 for delivery to the steam generator. A pump 38 is connected to conduit 37 and withdraws water from separator 29 for delivery to conduit 39. Conduit 39 is connected to generator 40 and the water forms a level sensed by float 41 in the generator. The float 41 adjusts valve 42 which is in a by-pass conduit around pump 38. A pressure must be maintained in generator 40 which will deliver steam to tower 18 and overcome the pressure drops in the cycle to the separator. The generator burner 43 is fired so as to maintain this pressure high enough to overcome the pressure drops, yet low enough to avoid any higher pressure than necessary. Pressure detector 43A is connected to generator 40 so as to respond to the internal pressure of generator 40 and regulate fuel valve 45 in fuel line 44.

If the volume of the total liquids stripped in tower 18 changes, the amount of steam should be changed accordingly. The flow of steam is regulated by connecting a flow sensing device 46 in conduit 25 and having it adjust valve 47 in accordance with a manually set controller 48. Therefore, the volume of the stripping medium can be kept parallel with the demand for the medium by the liquids flowing to tower 18.

CONCLUSION

The present invention has been disclosed as embodied in the process steps carried out in the apparatus indicated in the drawing and in the apparatus. A diluent is built from the crude production, kept in a closed cycle and returned to the system ahead of the basic field-processing equipment. The water, used to disengage the diluent from the crude production after it has been field-processed, is kept in a closed cycle, generated into steam and condensed back into water.

An initial charge of diluent may be used to reduce the viscosity and density of the mixture fed into the field-processing equipment. However, eventually this diluent charge changes in nature, becoming the lighter hydrocarbons of the crude itself.

Particular volumes, temperatures and pressures are deliberately not cited. They would not add to the disclosure of the broad concepts of the present invention. Whatever quantity of diluent necessary to reduce the viscosity and density of the mixture is assumed available. The quantity and temperature of the steam necessary to strip the diluent from the processed crude is provided. The cooling, pump sizes and separator capacity are assumed to be feasible to carry out the objects of the invention.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The present invention having been described, what is claimed is:

1. A process for treating a viscous, emulsified crude oil, including:
   adding a light hydrocarbon fraction to the viscous, emulsified crude oil to dilute the crude oil and facilitate separation of water from the mixture,
   separating water from the mixture of crude oil and the light hydrocarbon fraction,
   passing steam through the mixture to vaporize the light hydrocarbon fraction,
   cooling the steam and vaporized light hydrocarbon fraction until they condense,
   separating the condensed water from the hydrocarbon fraction,
   recycling the water separated to generate the steam,
   and utilizing the light hydrocarbon fraction to dilute the crude oil.

2. A process for treating a viscous, emulsified crude oil, including:
   adding a light hydrocarbon to the crude oil, the crude oil and light hydrocarbon mixture having a predetermined viscosity and density,
   heating the mixture to coalesce water from the mixture,
   passing steam through the mixture until the light hydrocarbon is stripped from the mixture,
   condensing the light hydrocarbon stripped from the mixture,
   condensing the steam used in stripping and recycling the condensed steam for generation again into steam to be used in stripping the mixture,
   and utilizing the light hydrocarbon fraction to add to the crude oil and obtain the mixture with predetermined viscosity and density.

References Cited

UNITED STATES PATENTS

| | | | |
|---|---|---|---|
| 1,879,849 | 9/1932 | Hunter | 208—187 X |
| 2,235,639 | 3/1941 | Koch | 208—188 |
| 2,785,120 | 3/1957 | Metcalf | 208—187 X |

DELBERT E. GANTZ, *Primary Examiner.*

GEORGE J. CRASANAKIS, *Assistant Examiner.*